Figure 1:
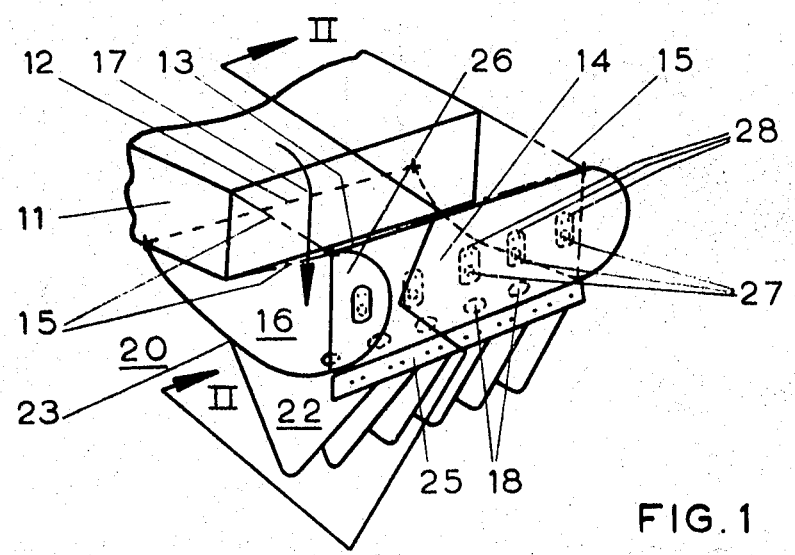

United States Patent

[11] 3,618,695

| [72] | Inventor | Raymond Leslie Wheeler<br>Isle of Wight, England |
|---|---|---|
| [21] | Appl. No. | 865,563 |
| [22] | Filed | Oct. 13, 1969 |
| [45] | Patented | Nov. 9, 1971 |
| [73] | Assignee | British Hovercraft Corporation, Limited<br>Yeovil, Somerset, England |
| [32] | Priority | Oct. 25, 1968 |
| [33] | | Great Britain |
| [31] | | 50,675/68 |

[54] FLEXIBLE SKIRT ASSEMBLIES FOR AIR CUSHION VEHICLES
5 Claims, 5 Drawing Figs.

[52] U.S. Cl. ............................................ 180/128, 180/124
[51] Int. Cl. ............................................ B60v 1/16
[50] Field of Search ............................................ 180/128, 127, 124

[56] References Cited
UNITED STATES PATENTS
3,265,144  8/1966  Shaw ............................................ 180/127
3,285,356  11/1966  Cockerell ............................................ 180/127
3,363,718  1/1968  Hammett ............................................ 180/124 X
3,536,156  10/1970  Crago ............................................ 180/128

*Primary Examiner*—A. Harry Levy
*Attorney*—Larson, Taylor & Hinds

ABSTRACT: An air cushion vehicle skirt assembly of the kind including an inflated space bounded by a flexible impermeable sheet. The space is subdivided into inner and outer compartments by a substantially vertical impermeable flexible diaphragm. Nonreturn valves in the diaphragm allow pressurized air to flow from the inner compartment to the outer compartment. The vertical diaphragm acts as a tension member to prevent the sheet bounding the lower part of the space extending downwardly more than a predetermined amount and so reduces skirt vibration. The pressurized air trapped in the outer compartment by the nonreturn valves provides buoyancy should the body of the vehicle tilt towards the surface of the water. The outer compartment at the forward end of the vehicle is separated from the remainder of the outer compartment by transverse impermeable diaphragms provided with nonreturn valves to permit the entry of pressurized air into that forward part. The space bounded by the flexible sheet may be subtended by a plurality of individual segments attached to the sheets.

FLEXIBLE SKIRT ASSEMBLIES FOR AIR CUSHION VEHICLES

This invention concerns air cushion vehicles, and more particularly flexible skirt assemblies for such vehicles.

Flexible skirt assemblies may include a flexible pressurized member bounded by a flexible impermeable sheet, and it will be apparent that the shape taken up by this sheet is dependent upon the ratio of the pressures on each side of the sheet. Because of the variable factors in air cushion vehicle operation, for example, all up weight, skirt daylight clearance, and changing output from lift fans, these pressure ratios are not constant and, therefore, the shape of the flexible pressurized member is not constant. The flexible pressurized member may, itself, form the lower part of the skirt assembly, or it may support additional skirts. In either case a change of shape of the flexible pressurized member will result in a change in the hemline of the skirt assembly. A skirt assembly with a hemline which may vary can result in the lower part vibrating and oscillation of the complete skirt assembly, which can lead to unacceptable vertical oscillation of the craft.

It is an object of the invention to reduce the tendency of the flexible skirt assembly to vibrate.

According to the invention I provide an air cushion vehicle skirt assembly of the kind including an inflatable impermeable flexible sheet of continuously curved cross section between lines of attachment to rigid structure of the vehicle, characterized by the provision of an internal dividing diaphragm attached to upper and lower portions of at least some part of the length of the space enclosed by the inflatable sheet, and separating that space into substantially longitudinal inner and outer compartments.

The inflatable flexible sheet may extend over the total height of the flexible skirt assembly; alternatively, an additional flexible skirt or additional flexible skirt elements may depend below the said member or said sheet.

The attachment of the upper edge of the diaphragm may be on the inflatable flexible sheet, or on the rigid structure of the vehicle. This will depend upon which provides the most suitable attachment line based upon the position of the lines of attachment of the flexible sheet on the vehicle and the shape which the flexible sheet takes up when inflated.

Figure 2:
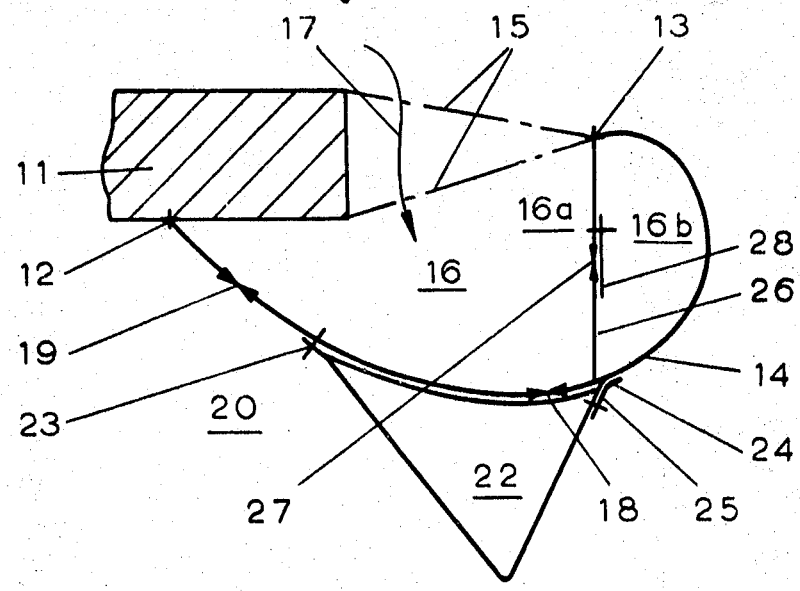
Figure 3:
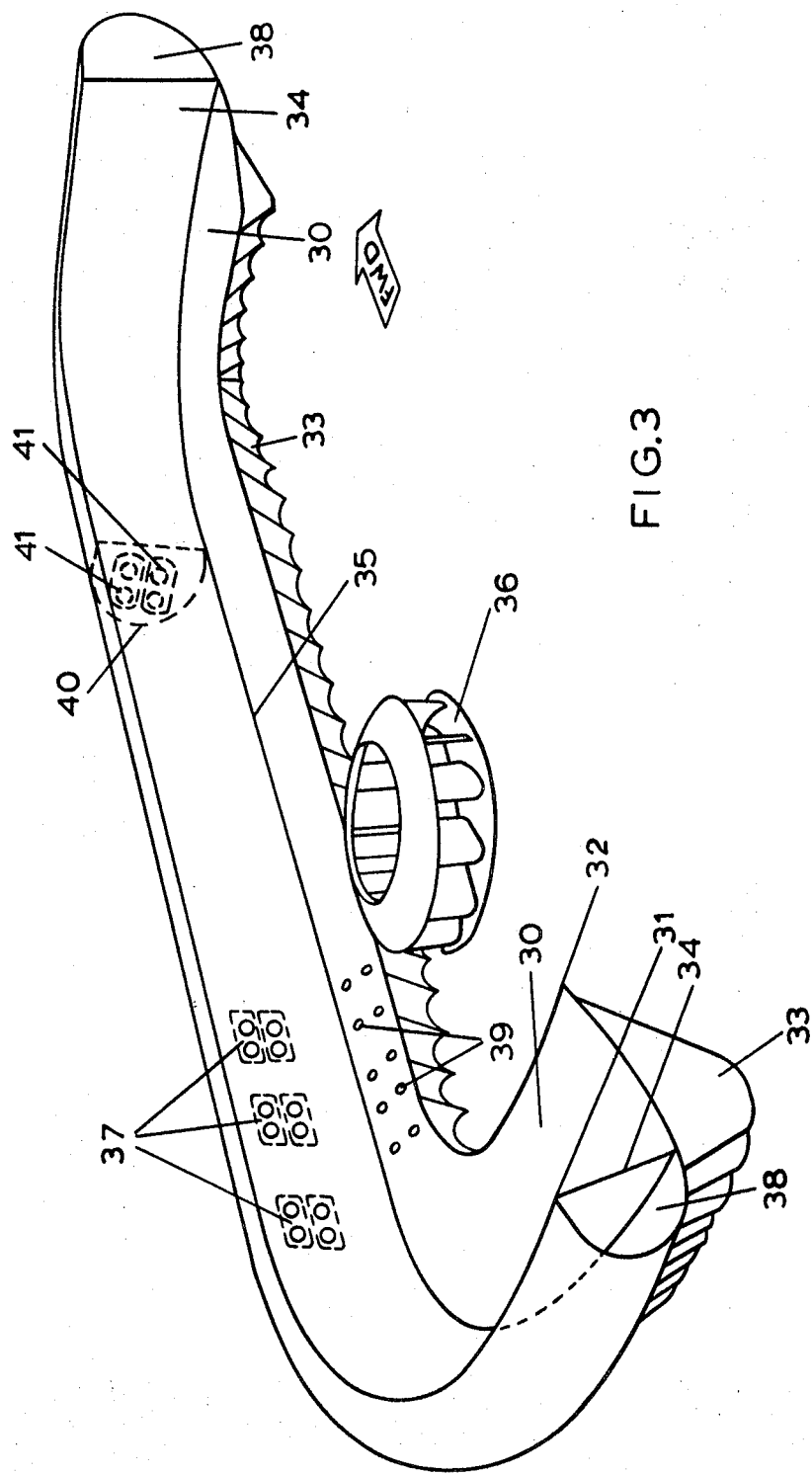
Figure 4:
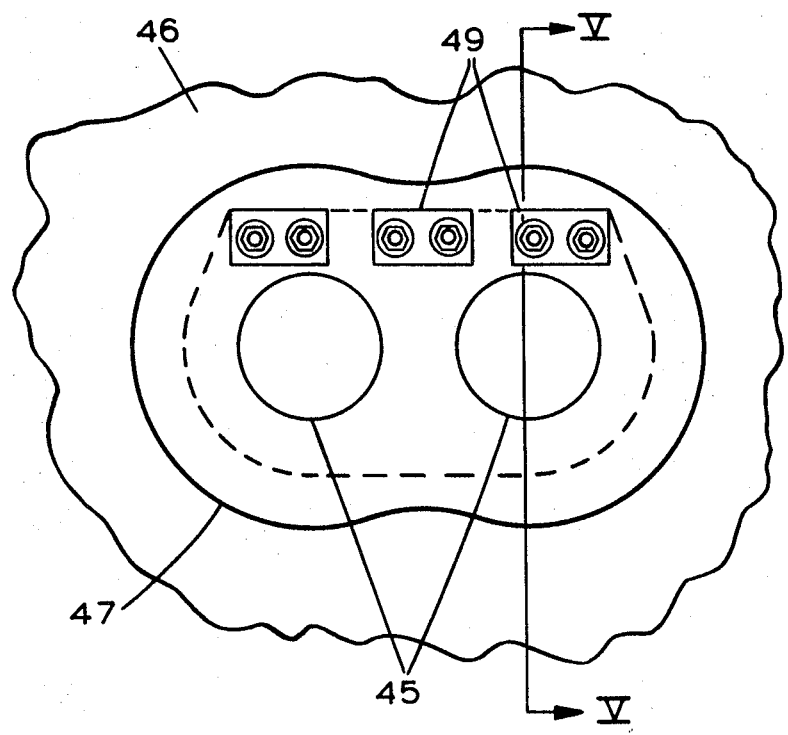
Figure 5:
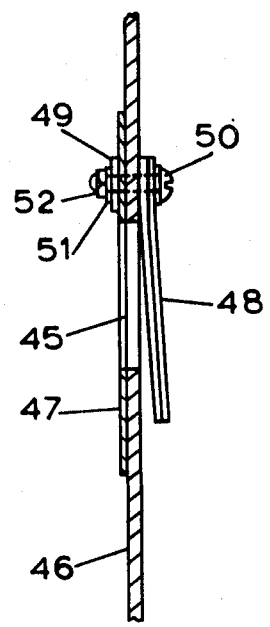

The invention will now be described, by way of example, with reference to the accompanying drawings, in which:

FIG. 1 is a diagrammatic view, looking towards the air cushion area, of part of the flexible skirt assembly according to the invention, FIG. 2 is a sectional elevation on a line II—II of FIG. 1, FIG. 3 is a diagrammatic view of one half of a flexible skirt assembly embodying the invention, which is suitable for fitting to a single fan air cushion vehicle, FIG. 4 is a view of part of the diaphragm on which a nonreturn flap valve is fitted, and FIG. 5 is a sectional view on the line V—V of FIG. 4.

Referring first to FIGS. 1 and 2, an air cushion vehicle has a rigid buoyancy member 11, to which is attached, by suitable releasable attachments, at inner and outer attachment lines 12 and 13 respectively, a flexible impermeable sheet 14. The outer attachment line 13 is on rigid struts, represented by the chain lines 15, which are connected to the rigid buoyancy member 11.

Pressurized air from one or more lift fans (not shown) passes by way of a duct represented by arrow 17, downwardly between the struts 15 to inflate the flexible sheet 14. When so inflated the flexible sheet 14 extends from its line of attachment 13 in a direction outwardly away from the vehicle supporting cushion 20, thereafter it extends downwardly and then inwardly and then upwardly in a substantially continuous curve to its line of attachment 12 on the buoyancy member 11, to enclose with the rigid structure a pressurized chamber 16. Pressurized air escapes from the chamber 16 by way of orifices 18 and 19 in the sheet 14, to generate and maintain the air cushion 20 which supports the vehicle above the surface 21.

Attached to and depending below the flexible sheet 14 are a plurality of discrete segments 22. U.S. Pat. No. 3,211,246 describes a skirt which is of corrugated form in plan view, the outer part of the corrugations being arcuate in plan view with their concave surfaces positioned for facing the cushion. A web extends from each side of the arcuate part and projects into the air cushion. In an embodiment of the patent the webs of each individual corrugation are not joined to the webs of adjacent corrugations, and the skirt comprises a plurality of individual discrete corrugated members. These members have become known in the art as "segments" or "fingers," and in this specification the expression "segment" will be used. The segments 22 are releasably attached to the flexible sheet 14 at inner fixing points 23 and outer fixing points 24. An apron 25 of flexible impermeable material forms a convenient outer fixing arrangement.

A diaphragm 26 of flexible impermeable material is attached to the inner surface of the flexible sheet 14 by airtight joints with an upper fixing line in the vicinity of the outer attachment line 13 of the sheet 14, and a lower attachment line in the vicinity of the apron 25, these two lines being substantially the uppermost and lowermost regions of the flexible sheet 14 respectively. The diaphragm 26 subdivides the pressurized chamber 16 into two compartments 16a and 16b, and has a plurality of orifices 27 to allow pressurized air to flow into both compartments. The orifices 27 have nonreturn valves to allow a free flow of air from compartment 16a to compartment 16b, and to restrict the flow of air in the reverse direction. Flaps 28 of substantially rectangular, flexible impermeable material, secured at their upper edges and arranged to cover the orifices, act as suitable nonreturn valves. One suitable type of nonreturn flap valve will be described later in the specification, with reference to FIGS. 4 and 5.

In operation, the compartment 16b, from which the outward flow of air is restricted by the nonreturn valves, has a more constant pressure, and thus a more constant shape than the remainder of the flexible pressurized chamber. The diaphragm also acts as a bracing member and restricts vertical movement of the lower part of the flexible sheet 14. The more constant shape and the limited vertical movement of the flexible sheet 14 to which the segments are attached, ensures that there is less vertical movement of the segments themselves and hence a more even hemline to the flexible skirt assembly. Thus the vibration characteristics of a flexible skirt assembly having a longitudinal diaphragm are altered, and the problem of skirt oscillation, which has become known in the art as "skirt bounce," is substantially overcome.

In this embodiment, the longitudinal diaphragm is described as being made of impermeable material, and is fitted with nonreturn flap valves to allow the pressurized air to flow to the chamber 16b. Extension of the skirt below the flexible pressurized chamber is by means of a plurality of independent juxtaposed flexible segments. It will be appreciated by those skilled in the art that other forms of flexible skirt could be used beneath the pressurized chamber, or the pressurized chamber could be used on its own. In such cases the vibration characteristics of the skirt may be such that skirt bounce can be avoided by fitting a diaphragm without the need to make one of the compartments a sealed compartment. In such a case it will be sufficient to make the diaphragm of permeable material, or to provide holes without nonreturn valves, to allow the air to flow to both sides of the diaphragm. The exclusion of nonreturn valves will mean a reduction in cost of the skirt assembly, and it may be that cost and acceptable level of skirt bounce will be the factors which decide the configuration to be used on a particular vehicle. For reasons similar to those just stated, it may be sufficient to provide the longitudinal diaphragm around only part of the skirt assembly. Alternatively, diaphragms may be provided in selected parts of the skirt assembly, and more than one diaphragm may be provided along all or any selected length of the assembly.

I have found that, by extending the diaphragm around the forward end of the skirt, the severity of a plough-in can be reduced. The phenomenon of plough-in is basic to all air cushion vehicles when operating over water. It is initiated by a disturbance in pitch which brings the forward part of the skirt into contact with the water. An additional component of drag is produced which tends to increase the nosedown pitch, leading to additional skirt immersion. It is evident that, under steady state conditions, if the craft pitch stiffness is too low the process will become divergent. The craft then pitches severely and decelerates more or less violently. Extension of the diaphragm around the front portion of the vehicle's skirt assembly provides what is virtually a sealed bag inflated with pressurized air from the other section through nonreturn valves in the diaphragm. When plough-in occurs air trapped in the sealed section provides positive buoyancy and reduces the maximum pitch angle achieved.

A flexible skirt assembly embodying a diaphragm in accordance with the invention, the diaphragm extending around the complete skirt assembly which is of a size suitable for fitting to a small air cushion vehicle having a single lift fan, will now be described with reference to FIG. 3 of the accompanying drawings. FIG. 3 shows one half of the flexible skirt assembly, and for the purposes of explanation the lift fan of the vehicle is also shown, although the rigid structure of the vehicle has been omitted.

A sheet of flexible impermeable material 30 is attached to rigid structure of the vehicle along a first line of attachment 31, and in operation extends in a direction outwardly away from the vehicle (not shown); thereafter it extends downwardly and then inwardly and upwardly in a substantially continuous curve to a second line of attachment 32 on rigid structure of the vehicle (not shown). Attached to and depending from the flexible sheet 30 are a plurality of juxtaposed flexible segments 33, as previously described in the embodiment of FIGS. 1 and 2 of the drawings. A diaphragm 34 of flexible impermeable material is connected at its upper edge in the vicinity of the first attachment line 31 of the flexible sheet 30, and is connected at its lower edge along a line of attachment 35 on the lower region of the flexible sheet 30. Pressurized air from the lift fan 36 is fed by way of suitable ducts (not shown) to inflate the space enclosed by the flexible sheet 30, the diaphragm 34 and the rigid structure. Pressurized air from this space passes by way of nonreturn flap valves 37 in the diaphragm 34, to inflate the space enclosed by the diaphragm and the outermost part of the flexible sheet 30, thus forming what is virtually a sealed pressurized duct 38 which extends around all of the peripheral region of the plan area of the vehicle. Pressurized air also escapes from the space enclosed by the flexible sheet 30, the diaphragm 34 and the rigid structure of the vehicle, through holes 39 in the flexible sheet 30 to generate and maintain the air cushion. The holes 39 are disposed along the flexible sheet 30 at any suitable spacing, but in FIG. 3 they have only been illustrated in one local area.

In single fan air cushion vehicles, where pressurized air is fed into the space enclosed by the flexible sheet 30, diaphragm 34 and vehicle rigid structure, from the lift fan 36 which is positioned towards the rear of the vehicle, and escapes along the length of the flexible sheet through the holes 39 to feed and maintain the cushion, a problem arises. This is due to the fact that the pressure in the space enclosed by the flexible sheet, the diaphragm and the rigid structure is highest at the rear and diminishes towards the bow of the vehicle. At the bow the pressure is too low to inflate the duct 38 properly, thus diminishing its buoyant properties and consequently its effectiveness in counteracting plough-in.

I have overcome this problem by placing a transverse web 40 across the duct 38 in the region of the termination of the bow portion and the commencement of the side portion of the skirt assembly. A similar transverse web is provided on the opposite side of the vehicle. The webs which are made from flexible impermeable material seal off the bow portion of the duct 38, and are provided with nonreturn flap valves 41. In operation, pressurized air passes into the duct 38 at the rear of the vehicle through nonreturn valves 37 in the diaphragm 34. It then passes around the duct 38, without loss of pressure, entering the bow portion of the duct through the nonreturn valves 41 in the transverse diaphragm 40. Thus, the bow portion of the duct 38 is inflated to maximum pressure, and is easily maintained at this pressure, giving it maximum buoyancy.

A simple nonreturn flap valve suitable for use in the invention is shown in FIGS. 4 and 5 of the accompanying drawings. Two holes 45 are cut in the diaphragm 46, and a reinforcing piece 47, also provided with two holes of the same size and spacing as those cut in the diaphragm, is bonded to one side of the diaphragm over the area immediately surrounding the holes. A flap 48, constructed from two thicknesses of flexible material bonded together, is attached along the area adjacent to its upper edge to the opposite side of the diaphragm 46 to which the reinforcing piece 47 is bonded. The flap 48 is attached just above the holes 45 by suitable fastening means such as flexible washer plates 49, screws 50, washers 51 and nuts 52, so that it extends downwardly to cover the holes, and its bottom edge terminates below to lowest edges of the holes.

In operation, the action of pressurized air on that face of the flap which is adjacent to the holes will cause the flap to bend and allow pressurized air to pass through the hole. When the pressure on the side of the diaphragm to which the flap is attached is equal to, or greater than, the pressure on the opposite side of the diaphragm, the action of the air on that face of the flap which is not adjacent to the holes will hold the flap against the diaphragm and prevent air escaping back through the holes.

I claim as my invention:

1. An air cushion vehicle skirt assembly comprising a flexible sheet for extending in a continuously curved cross section between lines of attachment to rigid structure of the vehicle and partially boundarying an inflatable space between said lines, an internal flexible impermeable dividing diaphragm attached substantially fluid tightly at its lower edge to lower portions of said sheet along at least part of the length of the space boundaried by said sheet, and at its upper edge to one of the group consisting of rigid structure of the vehicle and said sheet, said diaphragm being oriented substantially vertically to separate said boundaried inflatable space into elongate inner and outer compartments relative to a vehicle to which the assembly is attached, and nonreturn valves in said diaphragm for allowing air to pass from said inner compartment to said outer compartment.

2. An air cushion vehicle skirt assembly as claimed in claim 1, wherein the upper edge of the diaphragm is attached to rigid structure of the vehicle.

3. An air cushion vehicle flexible skirt assembly as claimed in claim 1, further comprising impermeable diaphragms for separating the outer compartment at the forward end of the vehicle to which the assembly is attached from the remainder of the outer compartment, said impermeable diaphragms extending transversely of said dividing diaphragm and being provided with nonreturn valves permitting entry of air to that forward part.

4. An air cushion vehicle flexible skirt assembly as claimed in claim 3, wherein an additional flexible skirt is attached at least in part to the flexible sheet.

5. An air cushion vehicle flexible skirt assembly as claimed in claim 4, wherein the additional flexible skirt comprises independent segments, each segment having an arcuate part and a flexible web extending from each side of the arcuate part.

* * * * *